US011990330B2

(12) United States Patent
Senko

(10) Patent No.: US 11,990,330 B2
(45) Date of Patent: May 21, 2024

(54) ION CENTRIFUGE ION SEPARATION APPARATUS AND MASS SPECTROMETER SYSTEM

(71) Applicant: THERMO FINNIGAN LLC, San Jose, CA (US)

(72) Inventor: Michael W. Senko, Sunnyvale, CA (US)

(73) Assignee: Thermo Finnigan LLC, San Jose, CA (US)

( * ) Notice: Subject to any disclaimer, the term of this patent is extended or adjusted under 35 U.S.C. 154(b) by 413 days.

(21) Appl. No.: 17/539,851

(22) Filed: Dec. 1, 2021

(65) Prior Publication Data

US 2022/0199392 A1 Jun. 23, 2022

Related U.S. Application Data

(60) Provisional application No. 63/129,025, filed on Dec. 22, 2020.

(51) Int. Cl.
*H01J 49/42* (2006.01)

(52) U.S. Cl.
CPC ........ *H01J 49/426* (2013.01); *H01J 49/4215* (2013.01)

(58) Field of Classification Search
CPC .. H01J 49/426; H01J 49/4215; H01J 49/4255; H01J 49/427; H01J 49/421; H01J 49/06
USPC .................................................. 250/281, 282
See application file for complete search history.

(56) References Cited

U.S. PATENT DOCUMENTS

| | | | | |
|---|---|---|---|---|
| 8,829,463 | B2 | 9/2014 | Senko et al. | |
| 2008/0210859 | A1* | 9/2008 | Tolley | H01J 49/424 250/282 |
| 2012/0181422 | A1 | 7/2012 | Sideris | |
| 2014/0299761 | A1* | 10/2014 | Giles | H01J 49/424 250/288 |
| 2017/0200597 | A1 | 7/2017 | Giles et al. | |

OTHER PUBLICATIONS

Extended European Search Report dated May 30, 2022, to EP Patent Application No. 21214079.2.

* cited by examiner

*Primary Examiner* — Kiet T Nguyen
(74) *Attorney, Agent, or Firm* — Thomas F. Cooney

(57) ABSTRACT

An ion separation apparatus comprises: (a) first and second ion carpets, each comprising: a substrate having first and second faces; and a set of electrodes disposed on or beneath the first face, wherein a configuration of a first plurality of the set of electrodes defines at least one group of circle sectors; (b) an ion exit aperture passing through one ion carpet; and (c) one or more power supplies configured to provide radio frequency voltages to a first subset of the electrodes of each ion carpet, to provide electrical potential differences across electrodes of the first subset of electrodes of each ion carpet, and to provide time-varying voltages to the first plurality of electrodes of each ion carpet that migrate through the sectors as a traveling wave, wherein the ion carpets are disposed parallel to one another with a gap therebetween, the first faces facing one another across the gap.

13 Claims, 14 Drawing Sheets

51b

ION CENTRIFUGE ION SEPARATION APPARATUS AND MASS SPECTROMETER SYSTEM

CROSS-REFERENCE TO RELATED APPLICATION

This application claims, under 35 U.S.C. 119(e), priority to and the benefit of the filing date of co-pending and commonly-assigned provisional application no. 63/129,025, filed on Dec. 22, 2020 and titled "Ion Centrifuge Ion Separation Apparatus and Mass Spectrometer System", the disclosure of which is hereby incorporated by reference herein in its entirety.

TECHNICAL FIELD

The present disclosure relates to mass spectrometry. More particularly, the present disclosure relates to ion transport and separation devices utilized as components of mass spectrometers.

INCORPORATION BY REFERENCE

All publications, patents, and patent applications mentioned in this specification are hereby incorporated by reference herein to the same extent as if each individual publication, patent, or patent application was specifically and individually indicated to be incorporated by reference, except that, in the event of any conflict between an incorporated reference and the present specification, the language of the present specification will control.

BACKGROUND

Most mass spectrometry apparatuses employ at least one mass filter. Broadly speaking, a mass filter is an apparatus that is capable of receiving an inlet stream of ions comprising a plurality of different ion species comprising different respective mass-to-charge ratio (m/z) values within a wide m/z range and outputting on outlet ion stream consisting of only a subset of the inlet ion species, wherein the subset of ion species comprises a much narrower m/z range. FIG. 1 schematically illustrates one example of a known use of a mass filter device 80. In this example, the mass filter device 80 is used to eliminate all ion species that do not comprise a desired m/z range from an ion stream generated by an atmospheric-pressure ion source. As depicted in FIG. 1, the mass filter device 80 comprises a quadrupole mass filter comprising a pair of X-rod electrodes 83 and a pair of Y-rod electrodes 81. In operation of the mass filter devices 80, one or more power supplies (not shown) provide oscillatory radio frequency (RF) voltage waveforms to the rod electrodes, with the RF phase applied to the Y-rod electrodes 81 being n radians out of phase with the RF phase applied to the X-rod electrodes 83. In known fashion, either a DC offset voltage and/or an oscillatory non-radio-frequency alternating current (AC) voltage may be applied to the rod electrodes in order to expel ions that are not within an m/z range of interest.

In operation, an electrospray ion source (or other atmospheric pressure ion source) 44 within an ionization chamber 41 emits a plume 45 of ions that are generally mixed with gas and or solvent droplets. The ions comprise a large number of various ion species having various m/z values. The charged particles (ions and some droplets) are separated from most of the gas by an electric field that diverts the charged particles into an aperture within a partition 42 that separates the atmospheric pressure ionization chamber 41 from an intermediate-vacuum chamber 43. In the illustrated example, the aperture is a lumen of a heated ion transfer tube 47 that promotes evaporation of most remaining droplets. The ions and remaining gas emerge into the evacuated chamber as a jet plume 71. An ion focusing device 169, such as an ion funnel or other stacked ring ion guide, narrows the ion plume into a narrow ion beam 72 that is directed into a central axis of the mass filter device 80 at an inlet end of the mass filter device. The outlet ion beam 75 that emerges from an outlet end of the mass filter device comprises fewer ion species than are contained in the ion beam 72. The reduction in the number of ion species is achieved by expulsion or neutralization of all ions that are not within the desired m/z range of interest before those ions are able to move through the mass filter device to its outlet port.

Because of the aforementioned ion expulsion, mass filters are not very efficient when considering overall ion usage. To increase the efficiency of ion usage, it is desirable to: (a) pre-separate each segment of ions of the incoming ion beam 72 into sub-groups, each of which includes only a subset of the ion species of the ion beam 72, wherein each subset of ion species comprises a narrower m/z range than the m/z range of the ion beam 72; and (b) deliver the various sub-group of ions to the mass filter sequentially. This is a challenging problem in that the ion pre-separation apparatus must be tolerant of high ion beam strengths, and if the pre-separation apparatus involves ion trapping, it must also be tolerant of high space-charge potentials. The device must also be able to eject ions with controlled energies, so that they are conducive to further mass isolation in the mass filter 80 and activation. Conventionally, ion mobility separation devices of various types are employed as the pre-separation and ion delivery devices that condition an ion beam prior to delivery to a mass filter device.

Radio Frequency (RF) ion carpets have been employed as focusing ion guides and ion transport devices and have previously been used in high energy physics experiments. Very generally speaking, an ion carpet is an ion transport apparatus comprising a substrate plate on which a plurality of electrodes are disposed, wherein oscillatory radio frequency (RF) voltages are applied to the electrodes, with the applied RF phase differing by n radians across each pair of adjacent electrodes. For example, Takamine et al. ("Space-charge effects in the catcher gas cell of a RF ion guide," Review of Scientific Instruments, 76[10], pp. 103503-103503-6, 2005) and Schwarz ("RF ion carpets: The electric field, the effective potential, operational parameters and an analysis of stability," International Journal of Mass Spectrometry, 299[2-3], pp. 71-77, 2011) have described the use of ion carpets for the capture of high energy particles in high energy physics experiments.

Only very rarely have there been descriptions of the use of ion carpet apparatuses in mass spectrometry applications. For example, in commonly-assigned U.S. Pat. No. 8,829,463, Senko et al. describe an ion-carpet ion transport apparatus that is used within a mass spectrometer for transport of ions from one or more ion sources. FIG. 2 is a schematic cross-sectional depiction of electrodes of one embodiment of ion-carpet ion transport apparatus 10 as taught by Senko et al. In three dimensions, the apparatus 10 is radially symmetric about a central axis 3. The apparatus 10 comprises a plurality of strip electrodes 4 that are disposed upon a flat substrate plate 8. The width and spacing of the strip electrodes 4 vary from the periphery to the center of the apparatus. Generally, wider electrodes are located towards the outer edges—away from the central axis 3 and the electrode width becomes progressively narrower towards the center. A generally cylindrical cage electrode 7 partially surrounds the plurality of strip electrodes 4 and an outlet aperture 1 is disposed inward from the innermost electrode or electrodes, preferably along the central axis 3. An extraction electrode 5 is disposed adjacent to the innermost strip electrode and supplied with a voltage so as to receive ions exiting the apparatus 10 through the outlet aperture 1. The extraction electrode 5 may comprise, for example, an ion transfer tube or any other form of ion transfer optics or ion optical assembly that serves to transfer ions collected by and from the ion carpet to another portion of an ion spectrometer (e.g., a mass spectrometer or an ion mobility spectrometer) of which the ion carpet apparatus is a part. The extraction electrode may comprise a dedicated component of the ion carpet apparatus.

In operation of the RF ion carpet apparatus 10, an RF voltage generator (not shown in FIG. 2) is electrically coupled to and provides an oscillatory voltage to each of the plurality of strip electrodes 4 such that an RF phase difference of n radians exists between each pair of adjacent electrodes. For instance, the plurality of strip electrodes 4 consists of two electrode subsets—a first electrode subset 4*a* and a second electrode subset 4*b* indicated by different shading patterns—such that an RF phase difference of n radians occurs between each pair of adjacent electrodes. Further, at least one direct current (DC) voltage generator (not shown) supplies a respective DC bias voltage to each one of the plurality of strip electrodes 4. A DC voltage is also supplied to the cage electrode 7. The applied DC voltages are such as to create electric fields that repel ions away from the cage electrode 7 and that urge ions to move away from the periphery and towards the central axis 3.

FIG. 2 further shows iso-potential lines 2 calculated using a one-dimensional electrostatic model in which the width of the ion carpet apparatus is set to 100 mm, the width of the outlet aperture is set to 2 mm, the voltage in the cage electrode 7 is set to 10 V, the voltage on the extraction electrode 5 is set to −110 V and the difference in bias DC potential between each adjacent pair of strip electrodes 4 is set at 1 V. The model also employs a 750 kHz RF voltage having a peak amplitude 200 V applied to each strip electrode. Ions ranging in mass-to-charge ratio (m/z) from 100 to 1000 are assumed to be generated from an ion source (not shown) located at a point near the top right corner of the apparatus. Ion trajectories through the ion carpet apparatus 10 were simulated using SIMION™ charged-particle optics simulation software commercially available from Scientific Instrument Services of 1027 Old York Rd. Ringoes N.J. 08551-1054 USA. The overall locus of ion pathways within the apparatus 10, as calculated according to the simulation, as described above, is indicated by ion cloud 6.

Senko et al. showed that high efficiency transfer of ions from the edge to the central outlet aperture of the apparatus 10 is possible. There are only a few descriptions (e.g., U.S. Pat. Nos. 5,572,035; 7,365,317) of the use of an ion carpet apparatus or related apparatus as an ion separation device. Nonetheless, the potentially large area adjacent to the surface of an ion carpet is suitable for temporarily storing and manipulating large fluxes of ions that are generated by an ion source. Spreading of the ions throughout the spatial region that is adjacent to the ion carpet's surface area can reduce the interfering influence of high space-charge potentials that may exist in conventional mass spectrometer pre-separation apparatuses. Further, it is known that, in the presence of multiple non-cooperating forces, ion species having different respective m/z values may be at least partially separated from one another. The present inventor has realized that one way of confining ions within a spatial area adjacent to the surface of an ion carpet is to balance inwardly-directed radial electrostatic forces against an outwardly directed radial "centrifugal force".

SUMMARY

To address the need for a more-efficient ion pre-separation device to be used upstream from a conventional mass filter, the present inventor has developed an ion centrifuge apparatus that employs a pair of ion carpet members. In particular, an ion separation apparatus is provided that comprises: (a) a first and a second ion carpet, each ion carpet comprising: a substrate having a first face and a second face; and a set of electrodes disposed on or beneath the first face, wherein a configuration of a first plurality of the set of electrodes defines at least one group of circle sectors; an ion exit aperture passing through one of the ion carpets; and one or more power supplies configured to provide oscillatory radio frequency (RF) voltages to at least a first subset of the electrodes of each ion carpet, to provide non-oscillatory direct current (DC) electrical potential differences across electrodes of at least the first subset of the electrodes of each ion carpet, and to provide time-varying DC voltages to the first plurality of the set of electrodes of each ion carpet that migrate through the sectors in the form of a traveling wave, wherein the first and second ion carpets are disposed parallel to one another with a gap therebetween, wherein the first faces of the ion carpets face one another across the gap.

In some embodiments, the gap is between 5 mm and 20 mm wide. In some embodiments, a gas pressure within the ion separation apparatus is in the range of 1 mTorr to 10 Torr (0.13 Pa-1.3 kPa). In some embodiments, the first plurality of the set of electrodes of each ion carpet defines a first group of circle sectors that are sectors of a first circle and a second group of circle sectors that are sectors of a second circle that is within the first circle, wherein a total number of the sectors of the first group of sectors is different than a total number of sectors of the second group of sectors. In some embodiments, each electrode of the first plurality of the set of electrodes of each ion carpet has the form of an arcuate segment of a circle and each electrode of the first subset of the electrodes of each ion carpet is a ring electrode having the form of a full circle, wherein the circles of the ring electrodes are concentric about a central axis of the ion separation apparatus that is perpendicular to the faces of the ion carpets and that passes through the ion exit aperture. In some other embodiments, the first plurality of the set of electrodes of each ion carpet is identical to the first subset of the electrodes of said each ion carpet.

BRIEF DESCRIPTION OF THE DRAWINGS

The above noted and various other aspects of the present invention will become apparent from the following description which is given by way of example only and with reference to the accompanying drawings, not necessarily drawn to scale, in which.

DETAILED DESCRIPTION

Figure 1:
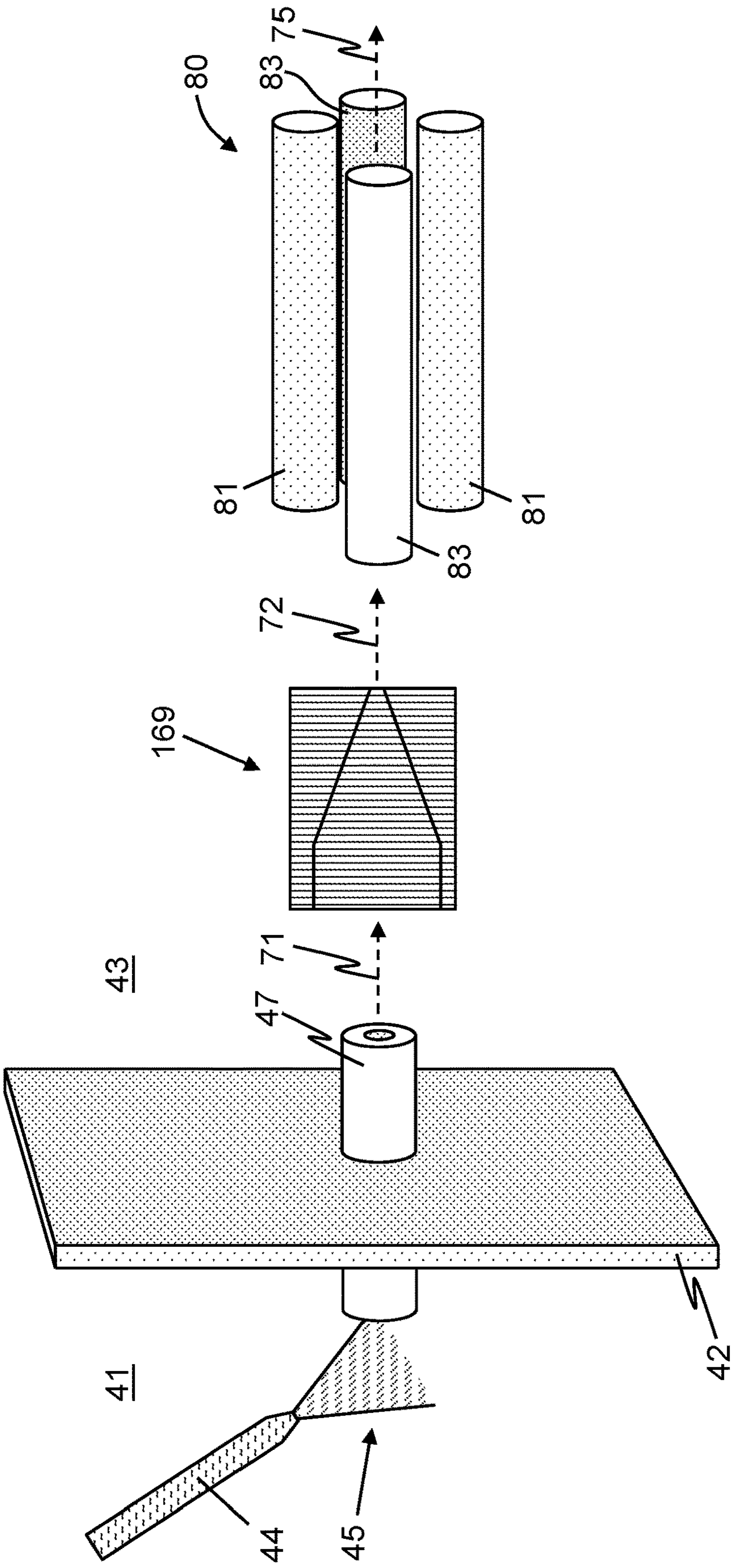
FIG. 1 (Prior Art)
FIG. 1 is a schematic depiction of a portion of a mass spectrometer apparatus comprising a mass filter that receives a stream of ions from an ion source.

The following description is presented to enable any person skilled in the art to make and use the invention, and is provided in the context of a particular application and its requirements. Various modifications to the described embodiments will be readily apparent to those skilled in the art and the generic principles herein may be applied to other embodiments. Thus, the present invention is not intended to be limited to the embodiments and examples shown but is to be accorded the widest possible scope in accordance with the features and principles shown and described. To fully appreciate the features and advantages of the present invention in greater detail, the reader is referred to the accompanying FIGS. 3A-3E, 4, 5A, 5B, 6A, 6B and 7-9, in conjunction with the following description.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that, for any given component or embodiment described herein, any of the possible candidates or alternatives listed for that component may generally be used individually or in combination with one another, unless implicitly or explicitly understood or stated otherwise. It will be understood that any list of candidates or alternatives is merely illustrative, not limiting, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements.

As used herein, the term "DC", when referring to a voltage applied to one or more electrodes of a mass spectrometer component, does not necessarily imply the imposition of or the existence of an electrical current through those electrodes but is used only to indicate that the referred-to applied voltage either is static or, if non-static, is non-oscillatory and non-periodic. The term "DC" is thus used herein to distinguish the referred-to voltage(s) from applied periodic oscillatory voltages, which themselves may be referred to as either "RF" or "AC" voltages. Similarly, the terms "RF" and "AC", when referring to an oscillatory voltage applied to one or more electrodes of a mass spectrometer component, do not necessarily imply the imposition of or the existence of an electrical current through those electrodes.

Figure 3A:
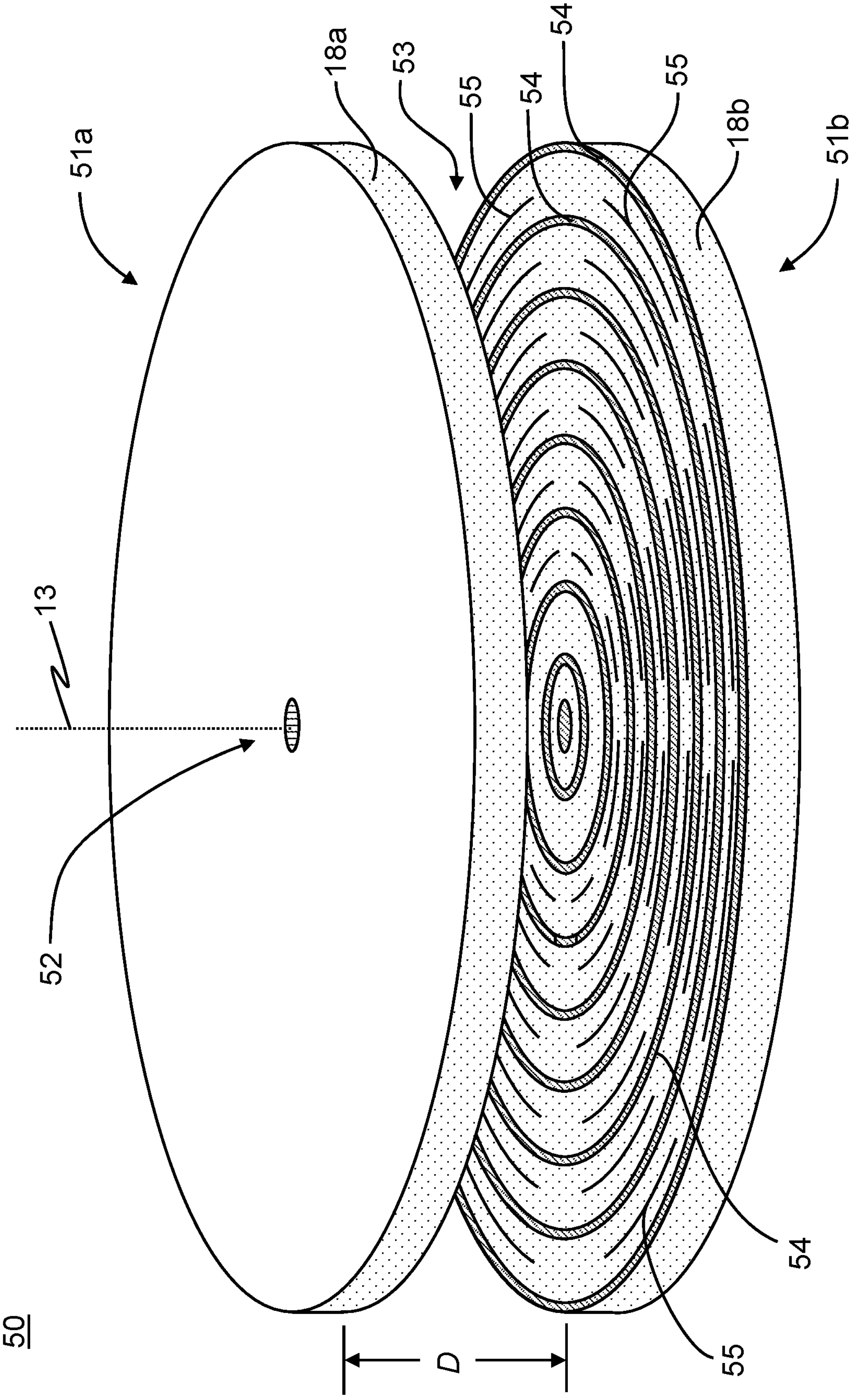
FIG. 3A is a schematic perspective view of a first ion separation apparatus in accordance with the present teachings.

FIG. 3A is a schematic perspective view of a first ion separation apparatus 50 in accordance with the present teachings. The ion separation apparatus 50 comprises two ion carpet members 51*a*, 51*b* comprising electrically insulative substrate plates or boards 18*a* and 18*b*, respectively that are disposed parallel to one another and that are separated by an inter-ion-carpet gap 53 of width, D. Each one of the ion carpet members comprises a first set of electrodes 54 and a second set of electrodes 55 disposed on or beneath a surface of the respective substrate plate or board, with the surfaces that have the electrodes thereon or thereat facing one another across the gap. In preferred embodiments, the ion carpet members may be fabricated as conventional printed circuit boards, wherein the substrates 18*a*, 18*b* comprise layered fiber-reinforced plastic and the electrodes 54, 55 comprise inter-laminated copper tracks. However, the substrate may comprise any suitably rigid insulative material and the electrodes may be any suitable electrically conductive material of any form, such as embedded or affixed wires or printed or deposited metal films or foils. Because of the perspective provided in FIG. 3A, the electrodes of ion-carpet-member 51*a* are not visible in the drawing.

One of the ion carpet members (ion carpet member 51*a* in FIG. 3A) has an ion exit aperture 52 that passes completely through the ion carpet member. In operation of the apparatus 50, separated ion species are outlet from the ion exit aperture 52 at different times in accordance with their respective mass-to-charge ratio (m/z) values. An extractor electrode (not shown) may be disposed adjacent to or within the ion exit aperture 52. A central axis 13 of the apparatus 50 that is normal to the parallel planes of the ion carpet members passes through the center of the exit aperture 52. A repeller electrode may also be provided on or in the opposing ion carpet member 51*b*. In operation, a voltage or voltages applied to the extractor electrode and/or a repeller electrode may aid in urging ions to exit through the aperture.

Figure 3B:
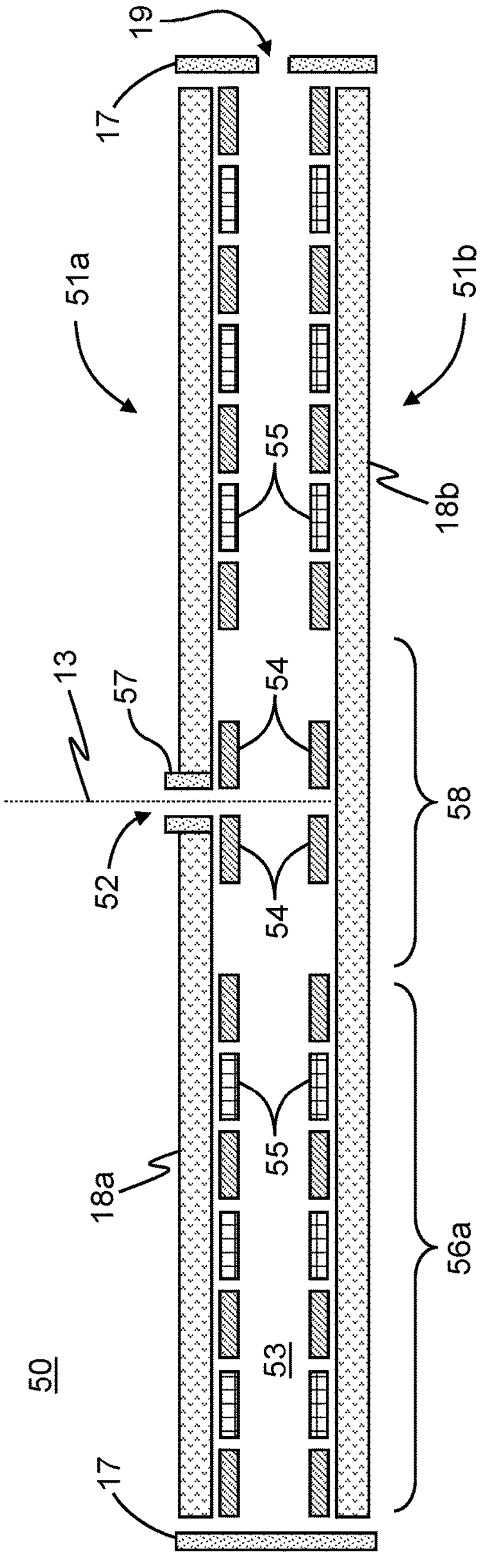
FIG. 3B is a schematic cross-sectional view of the first ion separation apparatus depicted in FIG. 3A, further showing an outer guard electrode structure.
Figure 3C:
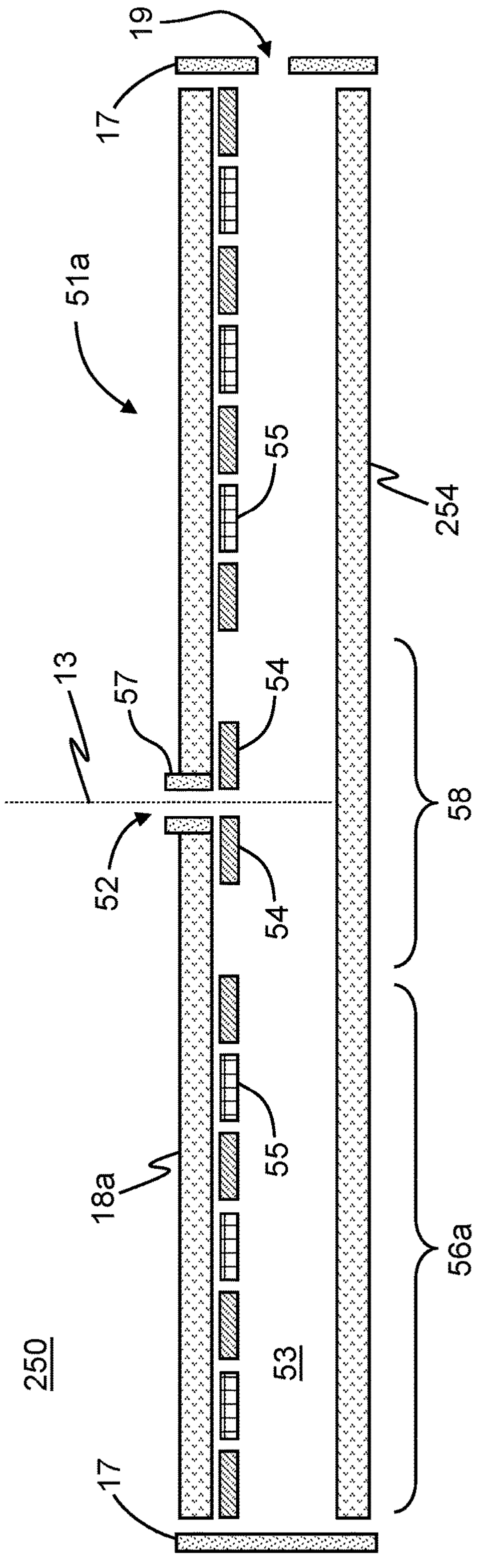
FIG. 3C is a schematic cross-sectional view of a variant embodiment of the first ion separation apparatus depicted in FIG. 3A.
Figure 3D:
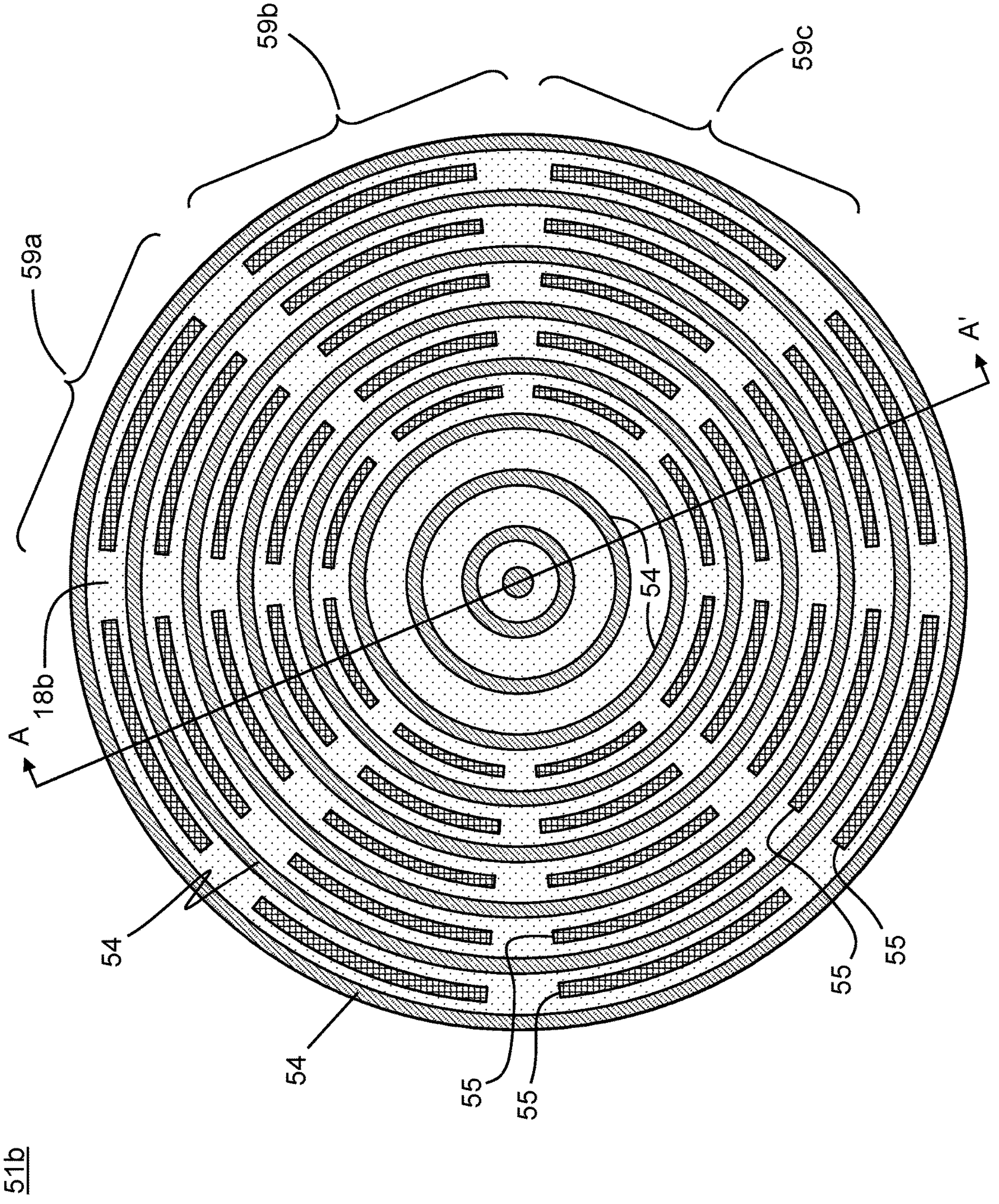
FIG. 3D is a schematic illustration of an electrode configuration of an ion carpet member of the ion separation apparatus of FIG. 3A.

FIG. 3B is a schematic cross-sectional view of the ion separation apparatus 50 depicted in FIG. 3A, as taken along the cross-section A-A' that is shown in FIG. 3D. As shown, the surfaces of the two ion carpet members 51*a*, 51*b* that have the electrodes 54, 55 thereupon or therein face one another across and define the inter-ion-carpet gap 53 therebetween. Although not explicitly illustrated in FIG. 3A, the ion separation apparatus 50 may also comprise one or more guard electrodes 17 that further bound the gap 53 and that, in operation, aid in constraining ions within the gap by preventing radially-directed ejection of ions out of the gap. In embodiments, the apparatus 50 may comprise only a single guard electrode 17 that surrounds the periphery of the two ion carpet members 51*a*, 51*b*. If the ion carpet members are circular in plan view, then such a single guard electrode may assume the form of a right circular cylinder. The guard electrode or electrodes, if present, have therein or therebetween one or more ion inlet apertures 19 which, in operation of the apparatus 50, are used to introduce ions into the inter-ion-carpet gap 53.

Also as illustrated in FIG. 3B, both ion carpet members 51*a*, 51*b*, comprise a first region 58 through which the central axis 13 passes and from which the second electrodes 55 are absent. The first region is surrounded by a second region 56*a* in which both the first and second electrodes 54, 55 are present. The first electrodes 54 are present in both regions 58, 56*a*.

FIG. 3C is a schematic cross-sectional view of an ion separation apparatus 250 in accordance with the present teachings. The apparatus 250 is a variant embodiment of the first ion separation apparatus depicted in FIGS. 3A-3B. The ion separation apparatus 250 differs from the ion separation apparatus 50 in that one of the ion carpet members is replaced by a simple plate electrode 254 that preferably comprises a flat electrode surface that is parallel to the remaining ion carpet member (e.g., ion carpet member 51*a*) and that faces the ion carpet member across the gap 53. The configuration of electrodes of the remaining ion carpet member remains unchanged from the configuration described above. Although FIG. 3C depicts the plate electrode 254 as a single integral piece, the plate electrode 254 may alternatively be provided as a conductive coating, film or foil disposed on or within a non-conducting substrate.

The replacement of one ion carpet member, with its patterned electrode structure, by a single plate electrode does not change the basic functioning of the apparatus, which depends on voltage profiles applied to electrodes of at least one ion carpet member. As is known, the so-called "pseudopotential fields" that are generated by the application of RF voltages to electrodes of the surface of an ion carpet device are effective in repelling ions of both polarities away from the surface. If a simple plate electrode that is provided with a voltage that repels ions of a given polarity is disposed parallel to and spaced apart from an ion carpet device, as shown in FIG. 3C, then the combination of the ion carpet and the plate electrode is also an ion confinement apparatus for ions of the given polarity. In this case, the ions are urged into the gap 53 by both the ion carpet and the plate electrode.

Returning to the discussion of the first an ion separation apparatus 50, FIG. 3D is schematic plan-view representation of ion carpet member 51*b* of that apparatus as viewed directly towards its electrode-bearing surface. The other ion carpet member 51*a* is generally similar to the ion carpet member 51*b* except that the ion carpet member 51*a* has the ion exit aperture at its center. The electrodes 54 comprise a set of concentric circular rings and are therefore referred to herein as ring electrodes. The geometric circles defined by the ring electrodes of the ion carpet members 51*a*, 51*b* are concentric about the ion exit aperture. Further, the projection of the ion exit aperture onto the ion carpet member 51*b* is essentially the common center of the circles that are defined by the ring electrodes 54. It should be noted that, although the ring electrodes of the ion carpet members 51*a*, 51*b* are substantially circular in form, the substrates upon which the substrates 18*a*, 18*b* upon or within which the electrodes are disposed are not necessarily circular in plan view and could be formed in any shape.

Figure 2:
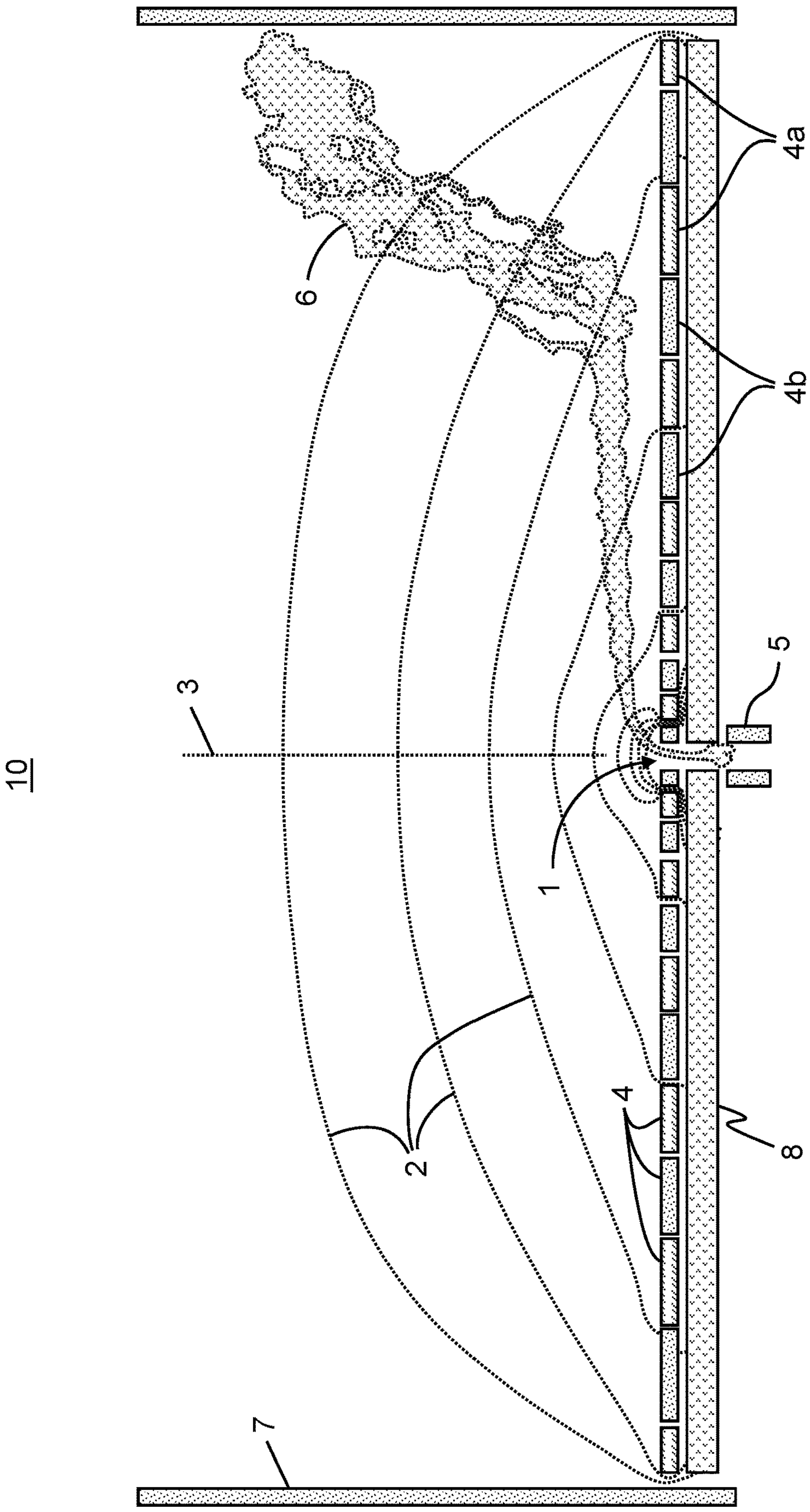
FIG. 2 (Prior Art)
FIG. 2 is a schematic cross-sectional depiction of electrodes of one embodiment of a known ion-carpet ion transport apparatus.

The electrodes 54 of the ion separation apparatus 50 are analogous to the electrodes 4 of the known apparatus 10 (FIG. 2). In operation of the apparatus 50, an RF power supply provides an oscillatory voltage to each of the plurality of ring electrodes 54 such that an RF phase difference of π radians exists between each ring electrode 54 and the nearest neighboring ring electrode(s) 54. Further, a direct current (DC) voltage generator (not shown) supplies a respective DC bias voltage to each one of the plurality of ring electrodes 54. The pseudopotentials created by the oscillatory RF voltages applied to the ring electrodes 54 of the ion carpet members 51*a*, 51*b* serve to constrain ions within the gap between the ion carpet members. The DC voltages that are applied to these same ring electrodes are such as to create DC electric fields that act to urge ions inwardly towards the common center of the ring electrodes.

The ion carpet members 51*a*, 51*b* further comprise a second set of electrodes 55 that are disposed between at least some pairs of the ring electrodes 54 as shown in FIG. 3D. These second electrodes are herein referred to as "paddle electrodes" because, in operation, their function is to urge packets of ions along circular pathways through an ion separation apparatus in partial geometric similarity to the fashion in which wooden or metal paddles of a water wheel carry parcels of water along partially circular pathways. As shown, the paddle electrodes may be provided in the form of geometric arcs that are segments of circles that are concentric with the circles defined by the ring electrodes 54. In the example shown in FIG. 3D, the paddle electrodes are organized into and define an integer number, n, of identical sectors (i.e., "pie slices") of the geometric circle that is defined by the outermost ring electrode 54. Accordingly, each paddle electrode is a member of and occupies a portion of only one of the sectors. In the hypothetical example shown in FIG. 3D, there are eight such sectors of the circle (i.e., n=8), three of which are labeled as sectors 59*a*, 59*b* and 59*c*. According to some embodiments, there are no paddle electrodes disposed between a subset of the ring electrodes 54 that are nearest to the circular center.

Figure 3E:
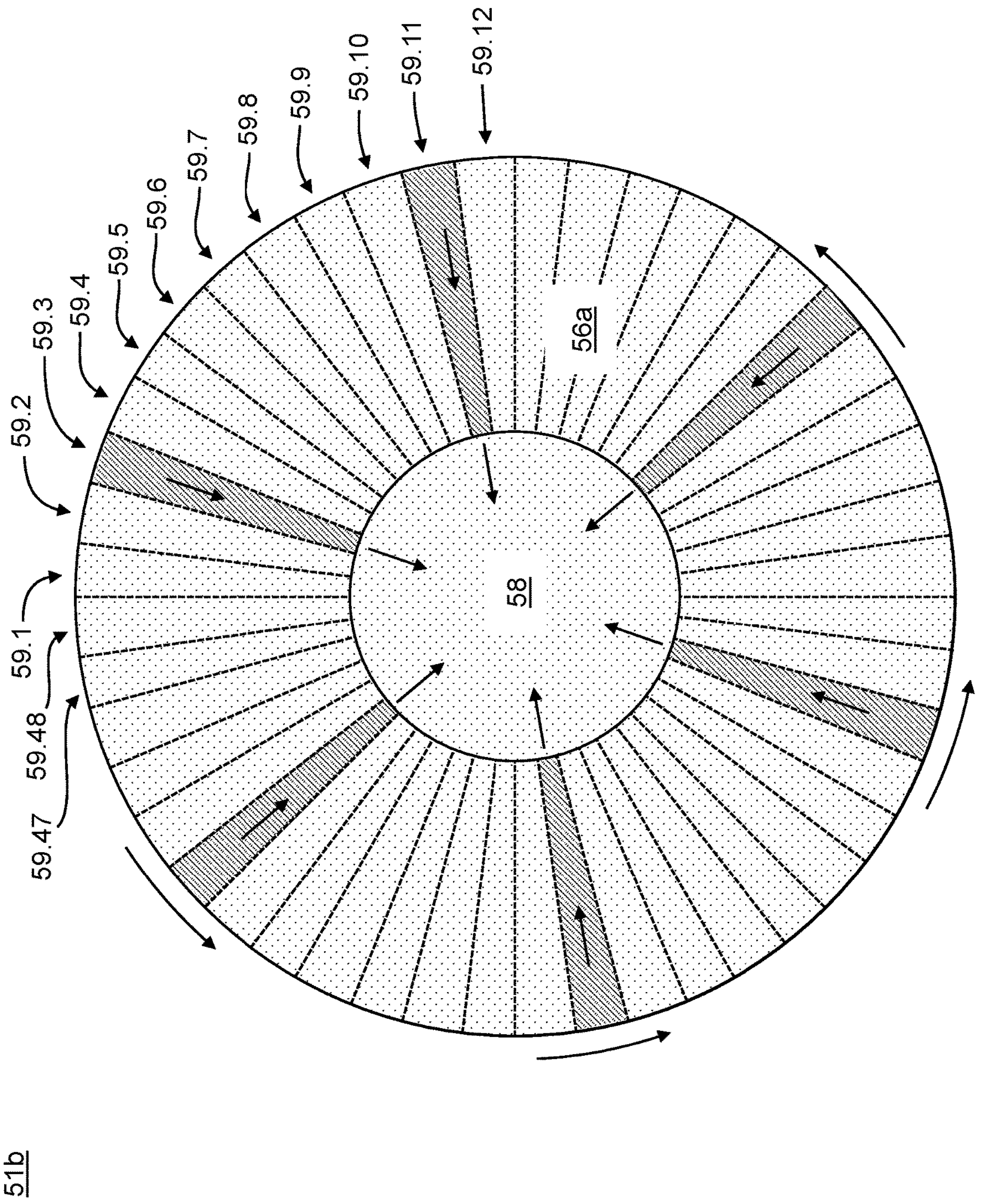
FIG. 3E is a schematic illustration of the application of a series of inwardly monotonically decreasing electrical potentials to the ring electrodes of the ion separation apparatus of FIG. 3A and a series of rotational-traveling-wave electrical potentials to the second set of electrodes of the ion separation apparatus.

For purposes of drawing clarity, the depiction of the ion carpet member 51*b* in FIG. 3D is limited to eight circle sectors, as defined by the alignment of the paddle electrodes 55. Preferably, the ion carpet member comprises a significantly greater number of circle sectors, such as the 48 circle sectors indicated in FIG. 3E, the first twelve of which are labeled as the circle sectors 59.1 through 59.12 and the final two of which are labeled as the circle sectors 59.47 and 59.48. For clarity of presentation, the individual ring electrodes and paddle electrodes are not depicted in FIG. 3E. Although only the ion carpet member 51*b* is illustrated in FIG. 3E as well as in FIG. 4, the discussion of FIG. 4 also pertains to the non-illustrated ion carpet member 51*a* of the apparatus 50. The central region 58 of the ion carpet member 51*b* is an area in which there are no paddle electrodes (c.f., the central portion of FIG. 3D). The remaining annular region 56*a* of the ion carpet member is the region in which paddle electrodes 55 are present.

By a mechanism to be described in greater detail below, DC electrical potentials are sequentially applied to the paddle electrodes 55 such that, in operation of the ion separation apparatus 50, ions are caused to undergo centrifuge-like circular motion within the apparatus as is schematically indicated by the arcuate arrows that are displayed around the periphery of the representation of the ion carpet member 51*b* in FIG. 3E. For example, a packet of ions that resides within an electropotential well at sector 59.11 that is formed by the paddle potential applied to sector 59.12 within a first incremental time period is caused to migrate into an electropotential well at sector 59.10 during a second incremental time period where the paddle potential is applied to sector 59.11. During a subsequent incremental time periods, the same packet of ions is caused to migrate to sectors 59.10 and 59.9, and so forth. At the same time, there may be several other packets of ions, as indicated by the shaded sectors, undergoing similar sector-to-sector migration in other portions of the annular region 56*a*.

At the same time that packets of ions are orbiting around the center of the apparatus in response to electrical potentials applied to the paddle electrodes 55, other DC electrical potentials are applied to the ring electrodes 54, a gradient of which causes the ions to migrate towards the center of the apparatus, as is indicated by the inward-facing arrows in FIG. 3E. The DC electrical potentials that are applied to the ring electrodes are superimposed on the oscillatory RF potentials described previously.

In a first approximation, ions must experience an inwardly-directed radial acceleration that is proportional to the square of the velocity and inversely proportional to radius in order to follow a stable, circular paths within the apparatus. The inwardly-directed radial acceleration is motivated by radial electric fields generated by the DC electrical potentials applied to the ring electrodes. If, at a particular radial distance, $r_1$, from the apparatus center, the radial force from the DC field is too weak to enable an ion species to remain in a stable circular orbit, ions of that species will migrate outward to a greater radial distance, $r_2$, where they will require an even greater inwardly-directed radial acceleration to remain stable. As a consequence, the pathways of such ions would not stabilize, thereby causing the ions to be ejected from the periphery of the apparatus. In order to prevent such ejection of ions, a DC electrical potential that repels the ions back towards the apparatus center may be applied to the guard electrode(s) 17, thereby stabilizing the orbits of the ions under the influence of the radial electric fields generated by the paddle electrodes.

The generation of the inwardly directed radial electrical field caused by application of potential differences to the ring electrodes 54 creates centripetal acceleration which is m/z dependent. If the radial field is ramped upwards, at some point the inward force will exceed the outward force, and ions will migrate towards the central axis 13 of the apparatus in an m/z dependent fashion.

To ease extraction of ions from the apparatus, in order of their m/z ratios, through the centrally located ion exit aperture 52, it is necessary to eliminate the forces exerted by the paddle electrodes. For this reason, paddle electrodes are absent from a central region 58 of the apparatus, as previously noted. The elimination of these forces allows ions to cool and drop cleanly into the ion exit aperture. Ions that reach the boundary of the central region 58 are drawn directly into the central region and towards the central axis 13 under the urging of the DC potential gradient caused by different DC potentials applied to the ring electrodes in that region. Upon reaching the central axis, one or more electrical potentials applied to an extractor electrode adjacent to or within the exit aperture 52 and/or to a repeller electrode on the ion carpet member 51*b* cause the ions to exit the apparatus through the aperture. Simulations also indicate that the elimination of the paddle electrode forces within central region 58 provides an additional benefit of better m/z resolution upon extraction of the ions. The reduction or elimination of the electric fields generated by voltages applied to the paddle electrodes 55 may be accompanied by an increase in the radially inwardly directed fields generated by voltages applied to the ring electrodes 54, possibly configured in one or more annular regions as described further below.

Figure 4:
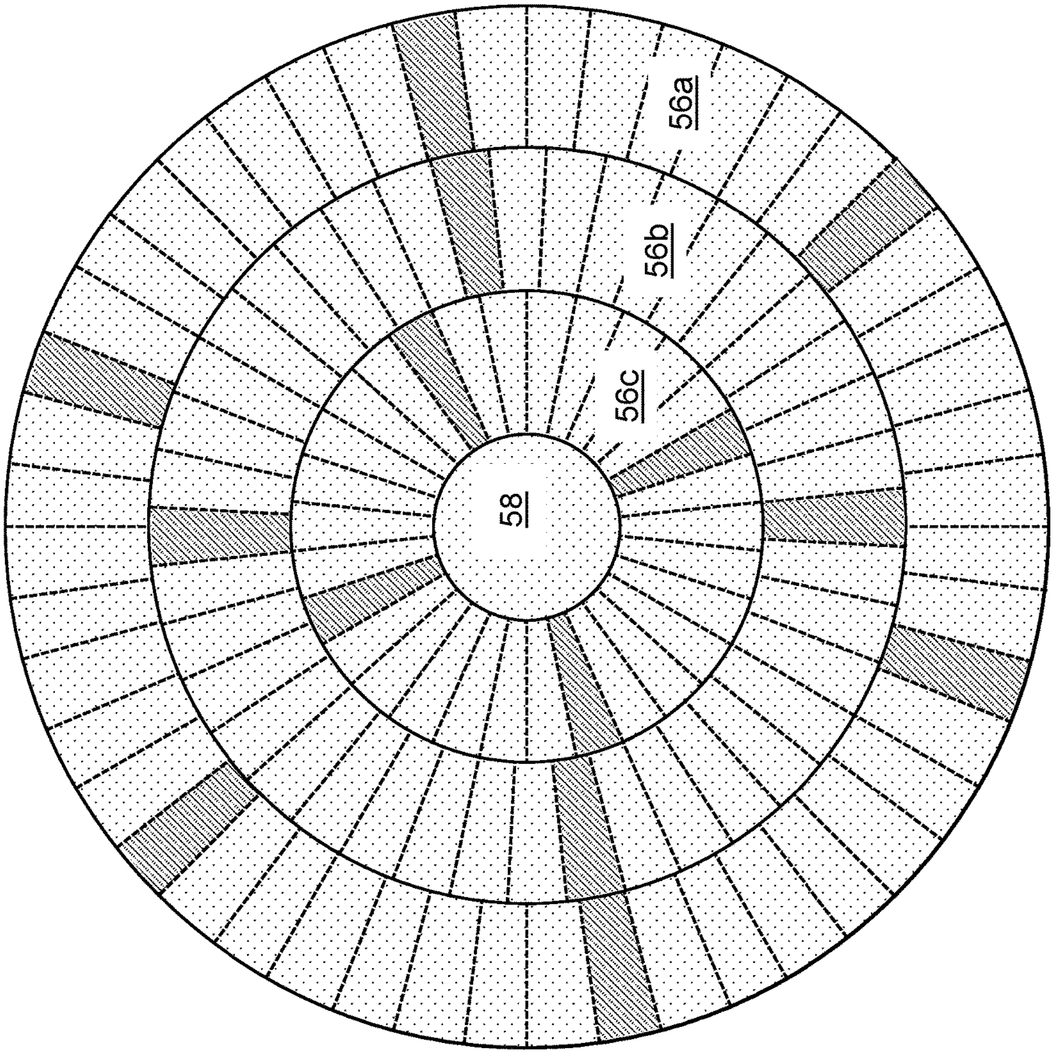
FIG. 4 is a schematic illustration of an alternative electrode configuration of an ion carpet member of the ion separation apparatus of FIG. 3A.

As noted above with reference to FIG. 3D and FIG. 3E, the various sectors of each ion carpet member of the ion separation apparatus 50 are defined by the presence and configuration of the paddle electrodes 55. FIGS. 3D-3E illustrate a configuration in which the paddle electrodes define forty-eight identical sectors (i.e., the noted sectors 59.1-59.12 and others) occupying an annular region 56*a*. In another example, FIG. 4 illustrates a variation of the sector configuration in which the number and angular width of sectors on an ion carpet member vary with radial distance from the central axis 13, thereby defining three paddle-electrode-bearing annular regions 56*a*, 56*b*, 56*c* in addition to the central paddle-electrode-free region 58. The sectors within each annular region are identical to one another but there are different numbers of sectors within each annulus. Further, the orbital frequency, $f_r$, and/or the form of the paddle-electrode waveform profile may vary between different annular regions.

Figure 5A:
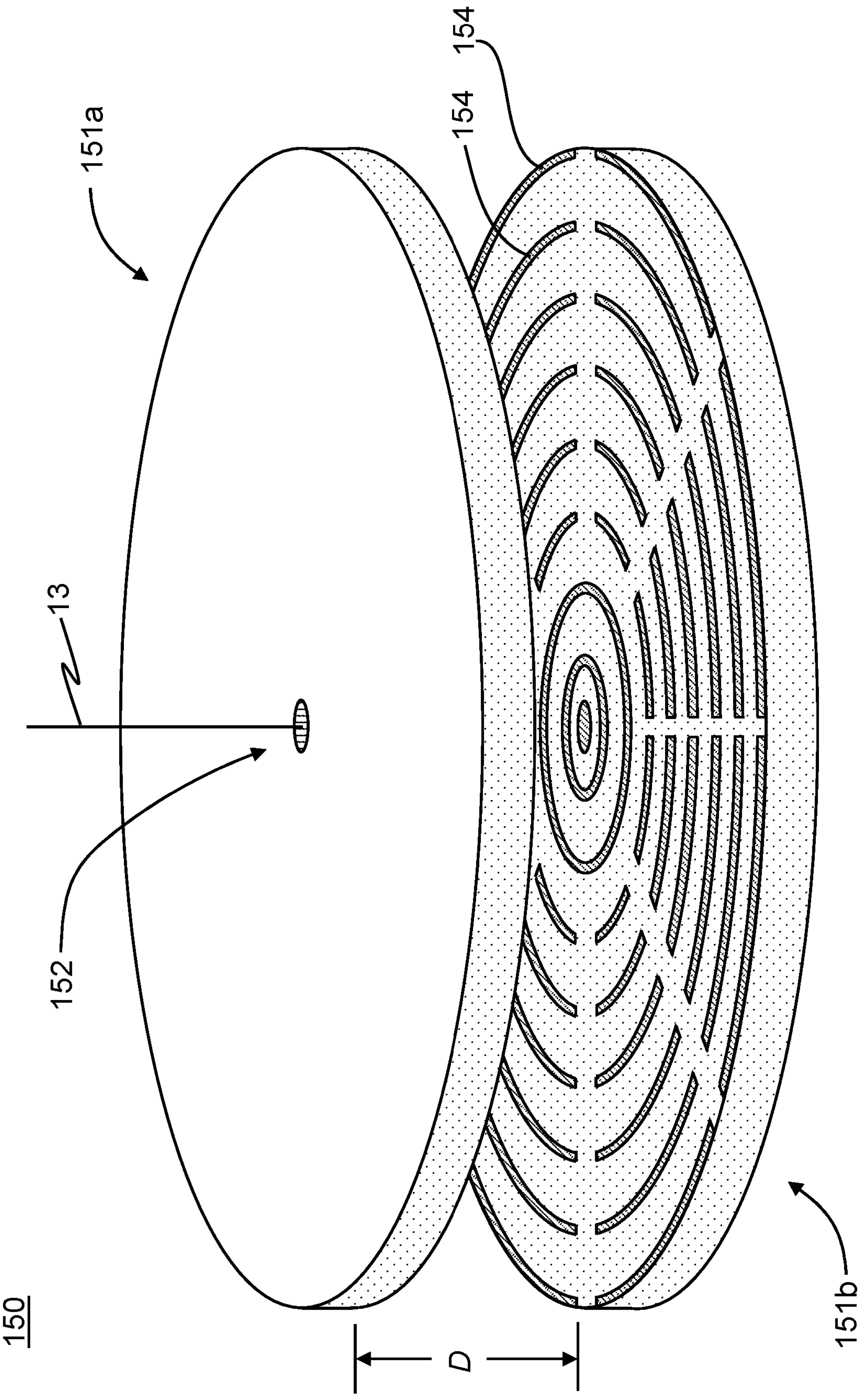
FIG. 5A is schematic perspective view of a second ion separation apparatus in accordance with the present teachings.
Figure 5B:
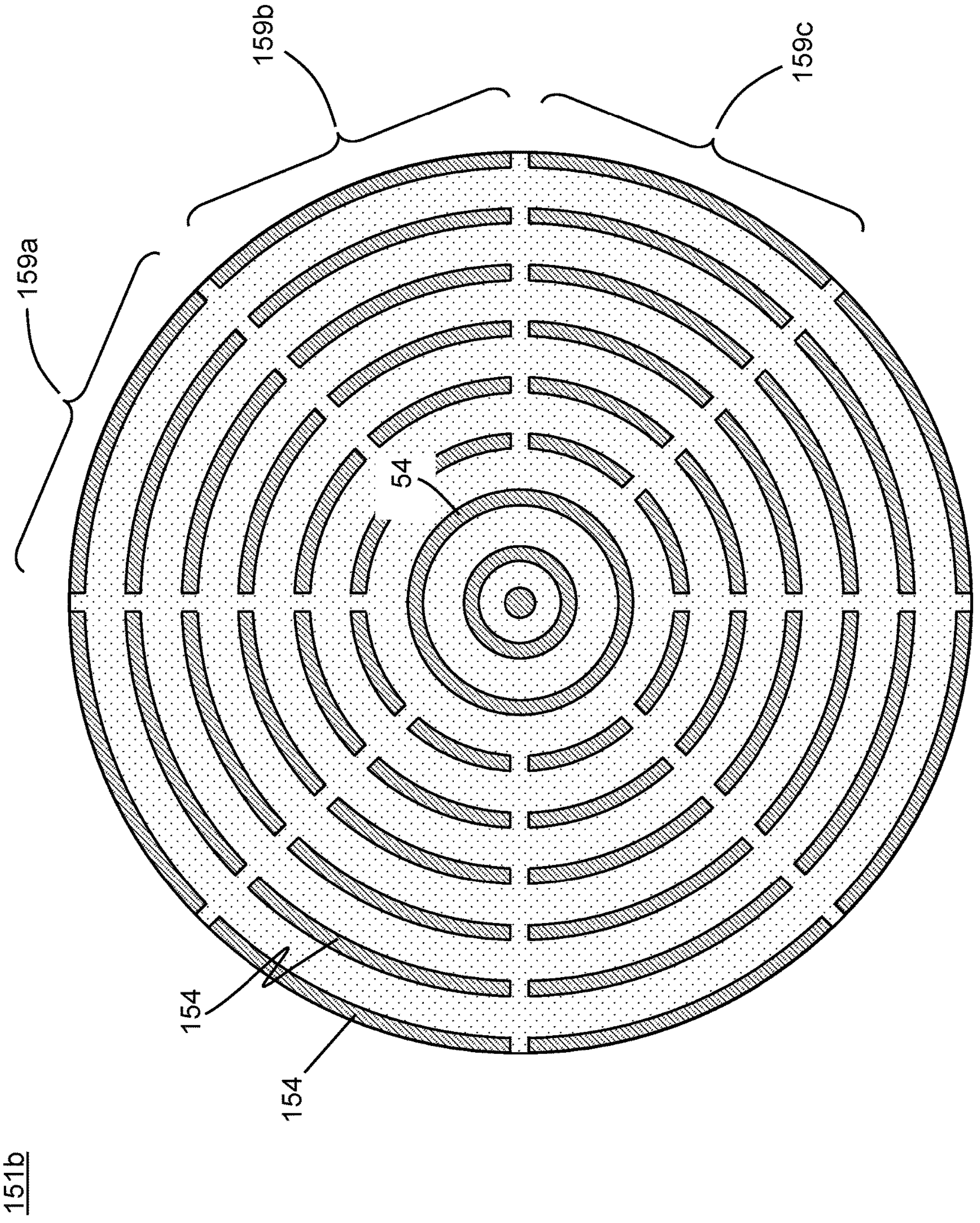
FIG. 5B is a schematic illustration of an electrode configuration of an ion carpet member of the ion separation apparatus of FIG. 5A.

FIGS. 5A-5B relate to a second ion separation apparatus, apparatus 150, in accordance with the present teachings. FIG. 5A is schematic perspective view of the ion separation apparatus 150 and FIG. 5B is a schematic illustration of an electrode configuration of an ion carpet member of the ion separation apparatus 150. As previously described with respect to the ion separation apparatus 50 (e.g., FIG. 3A), the ion separation apparatus 150 comprises two ion carpet members, designated as ion carpet member 151*a* and ion carpet member 151*b*, each ion carpet member comprising an electrically insulative substrate plate or board. The two substrate plates or boards are disposed parallel to one another and are separated by an inter-ion-carpet gap having distance, D. Each one of the ion carpet members comprises a respective set 154 of electrodes disposed on or within the respective substrate plate or board on one side of the respective ion carpet member. The sides that have the electrodes thereon face one another across the gap. the ion carpet members may be fabricated as discussed above with regard to the apparatus 50. One of the ion carpet members 151*a* has an ion exit aperture 152 that passes through the substrate plate thereof. Otherwise, the two ion carpet members 151*a*, 151*b* are generally similar to one another. A central axis 13, which is normal to the planes of the parallel ion carpet members passes through the center of the ion exit aperture 152.

The ion separation apparatus 150 (FIGS. 5A-5B) is generally similar to the ion separation apparatus 50 (e.g., FIGS. 3A-3D) except for the configurations of electrodes on the mutually facing ion carpet member surfaces. Specifically, whereas the facing surfaces of the ion carpet members 51*a*, 51*b* of the ion separation apparatus 50 comprise two sets of electrodes—a set of ring electrodes and a set of arcuate paddle electrodes—the ion carpet members 151*a*, 151*b* of the ion transport apparatus 150 each have only a single set of electrodes, here referred to as segmented ring electrodes 154. The individual segmented ring electrodes are all disposed on each substrate plate or board along concentric circles that are that are centered on the central axis 13. Further, the segmented ring electrodes 154, which are preferably arcuate in shape are configured in groups that define a plurality of identical circular sectors. For example, as depicted in FIG. 5B, the ion transfer member 151*b* comprises eight such sectors. Three such sectors—159*a*, 159*b* and 159*c*—are specifically indicated in FIG. 5B. Although eight sectors are depicted in FIG. 5B, the ion carpet members 151*a*, 151*b* may comprise any number of sectors. As noted previously herein, one the ion carpet members 151*a*, 151*b* may be replaced by a simple plate electrode.

In operation of the ion separation apparatus 150, one or more power supplies (not shown) supply, to the electrodes 154: (a) oscillatory RF voltages of the same amplitude, such that all electrodes 154 of a single circle of electrodes receive the same RF phase and such that the RF phase that is applied to each circle of electrodes differs by n radians from the RF phase that is applied to each of the one or two other circles of electrodes that is a nearest neighbor of said circle of electrodes; (b) a first DC offset voltage that either increases or decreases inwardly between each circle of electrodes; and (c) a travelling DC voltage waveform that migrates around the sectors in either clockwise or counterclockwise fashion. Accordingly, in operation of the apparatus 150, the segmented ring electrodes 154 of the ion separation apparatus 150 provide the combined ion directing forces as provided by the two sets of electrodes of the apparatus 50.

Figure 6A:
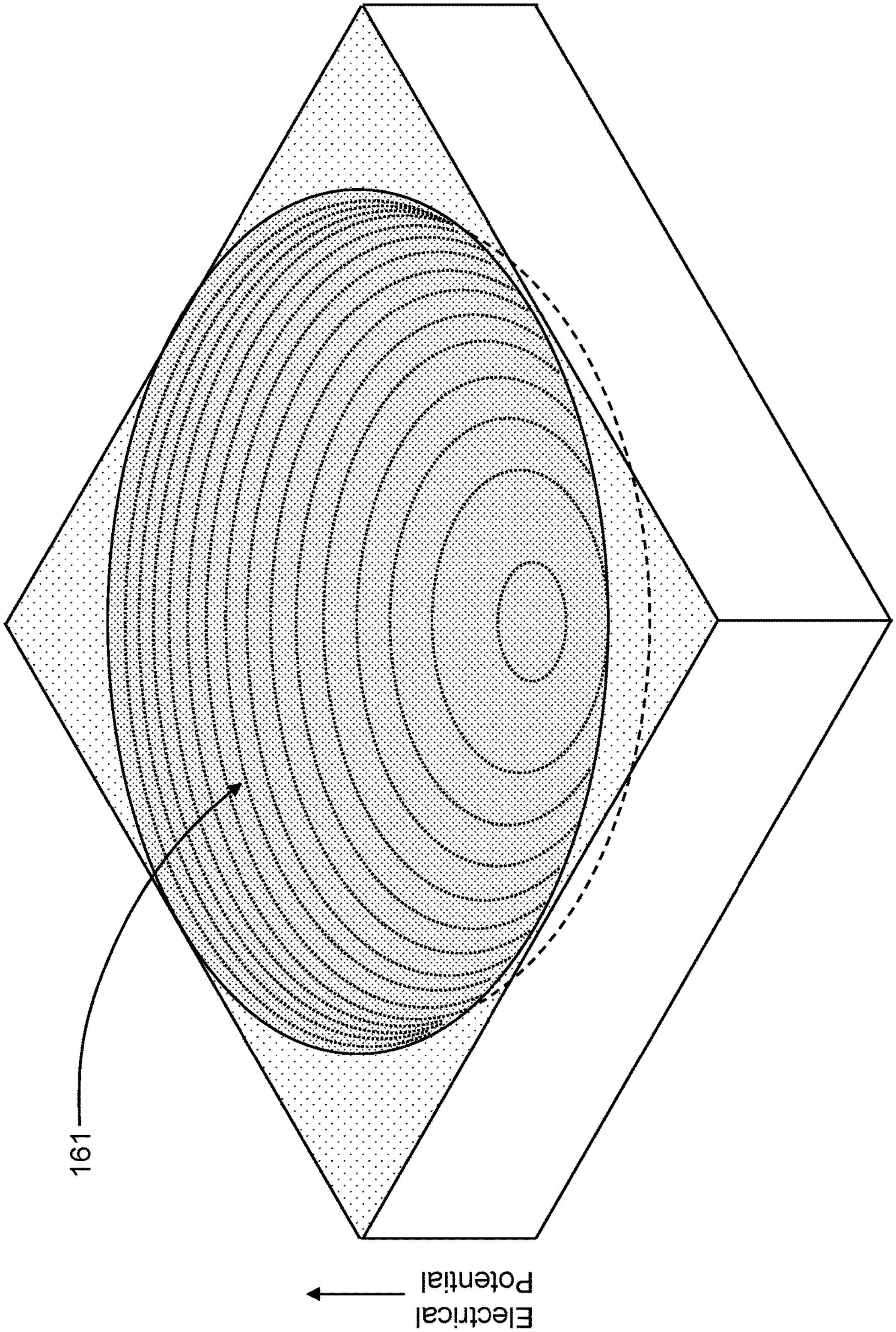
FIG. 6A is a schematic illustration of the electrical potentials applied to the ring electrodes of an ion separation apparatus in accordance with the present teachings.
Figure 6B:
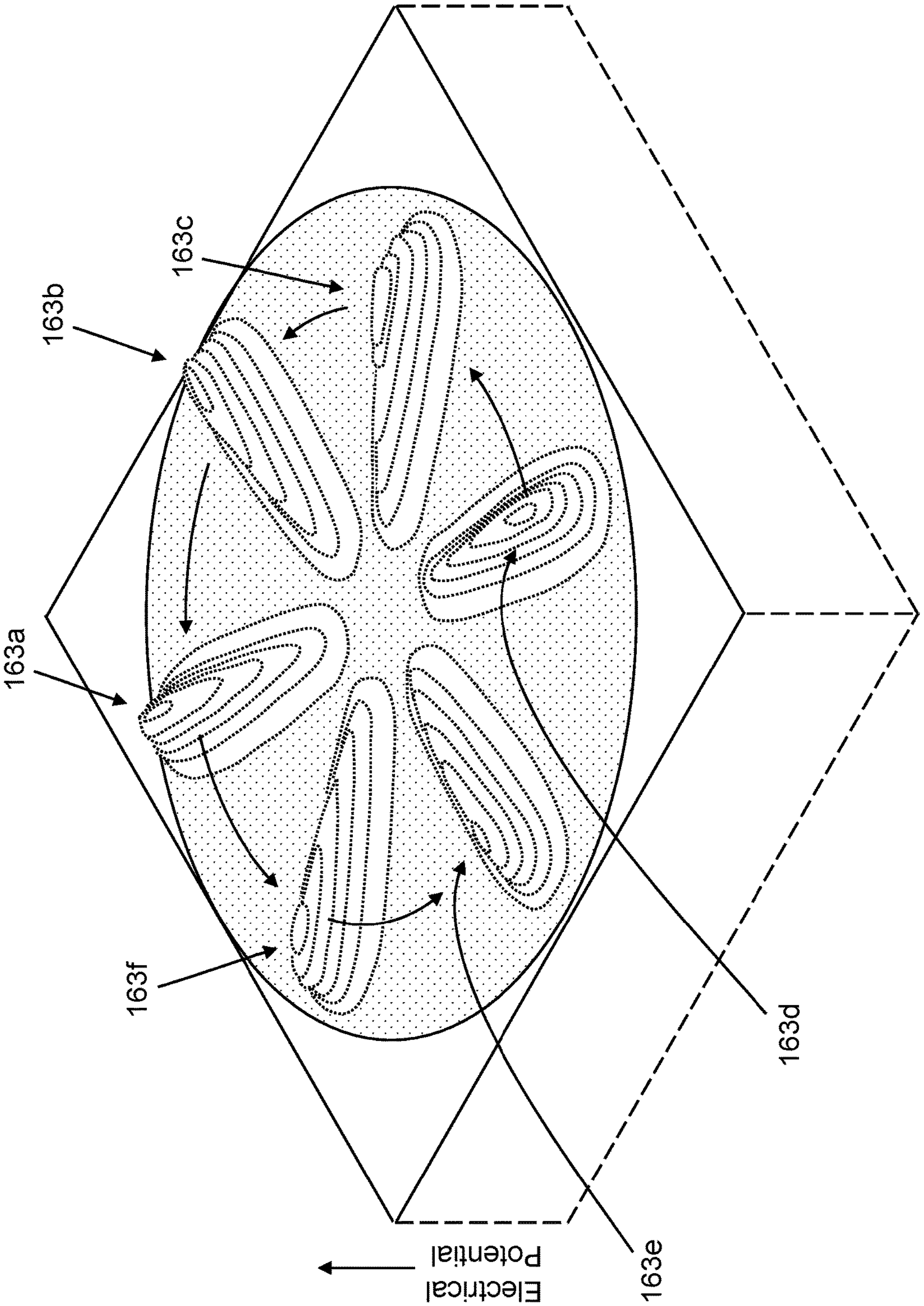
FIG. 6B is a schematic illustration of the of the rotationally-traveling-wave electrical potentials to a set of paddle electrodes of an ion separation apparatus in accordance with the present teachings.

FIGS. 6A and 6B are schematic "topographic" diagrams of the electrical potentials applied to the ring electrodes and paddle electrodes of an ion separation apparatus that is configured in accordance with the general discussion set forth above in reference to FIGS. 3A-3D. Dotted schematic iso-potential "contour lines" in FIG. 6A and FIG. 6B describe the general shape of electro-potential surfaces generated within the ion separation apparatus in response to controlled voltages applied to the ring electrodes 54 and paddle electrodes 55, respectively, as illustrated in FIG. 3D. These surfaces are drawn under the assumption that positively charged ion species are undergoing separation within the apparatus.

In accordance with the above assumption, electropotential surface 161 of FIG. 6A is a potential well that tends to urge positively charges ions to towards the center of the apparatus. Although the electropotential surface is illustrated as a general paraboloid of revolution, it may alternatively be configured as a surface having non-parabolic cross sections. The exact form of the electropotential surface may be created through a combination of a choice of voltages applied to the ring electrodes and a choice of ring-electrode interspacing. Still assuming separation of positively charged ion species, the individual paddle-electrode electropotential surfaces 163*a*-163*f* comprise a plurality of electrical potential peaks that tend to urge ions to move tangentially to the circles of the ring electrodes. The full electrical potential surface also includes intervening potential wells between the individual potential peaks. The periodicity of DC electrical potentials applied to the individual paddle electrodes cause both the peaks and valleys to rotate about the central axis of the apparatus, in either clockwise or counterclockwise fashion, the latter of which is illustrated by the arcuate arrows in FIG. 6B. In operation, the resultant electropotential surface at any time is a complex superimposition of the electropotential surface 161 of FIG. 6A, the paddle-electrode electropotential surfaces 163*a*-163*f* of FIG. 6B and the time-varying electropotential surfaces provided by the RF voltages applied to the ring electrodes.

Figure 7:
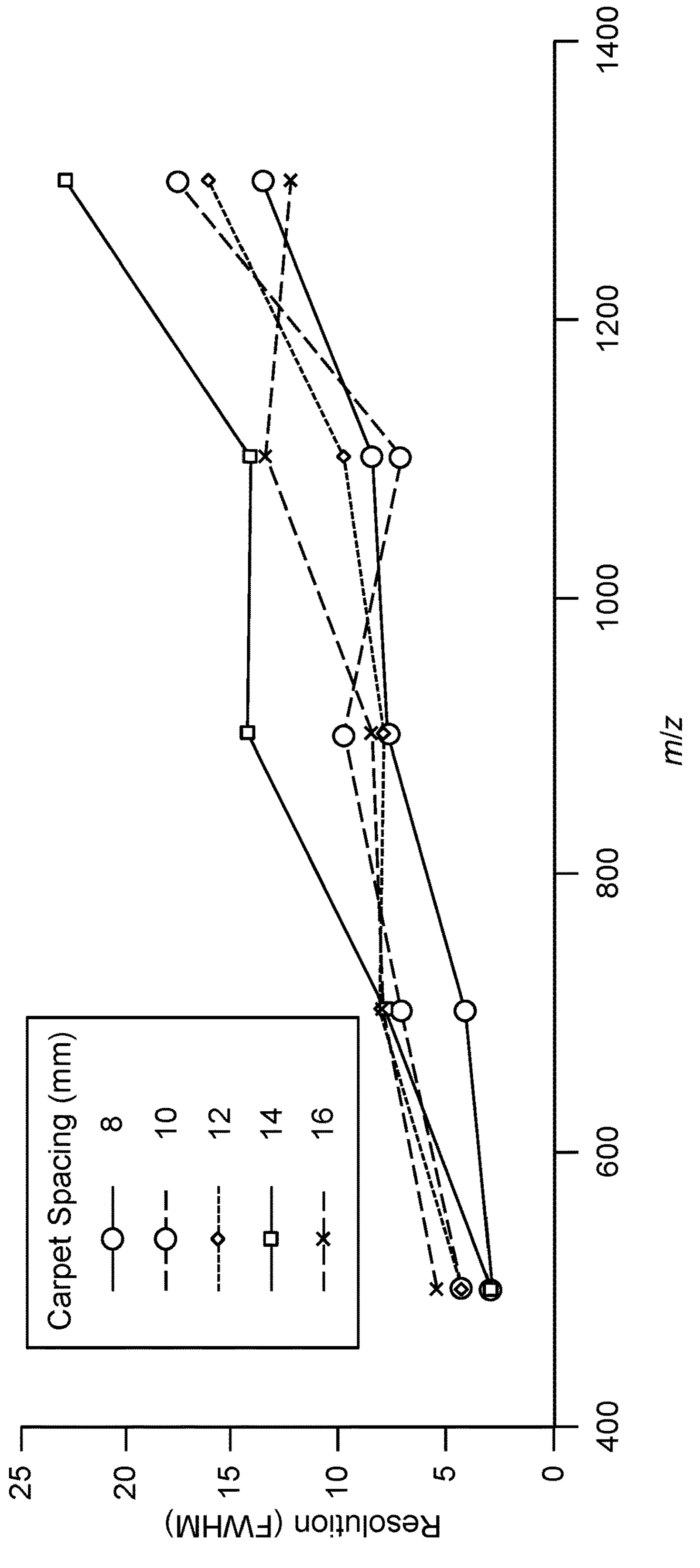
FIG. 7 is a set of graphs of the calculated ion separation resolution of an ion separation apparatus in accordance with the present teachings as it varies with the spacing between two ion carpet members and with mass-to-charge ratio of ions outlet from the apparatus.

FIG. 7 is a set of graphs of the calculated ion separation resolution, as determined by simulations of ion trajectories, of an ion separation apparatus in accordance with the present teachings as it varies with the spacing between two ion carpet members and with mass-to-charge ratio of ions outlet from the apparatus. The simulated extraction of ions included ramping of the inwardly directed radial field using an RF amplitude applied to the ring electrodes of 200 V at a frequency of 1 MHz, a paddle electrode voltage amplitude of 50 V applied at a circular frequency of 4 kHz and a helium gas pressure of 0.075 Torr (10 Pa).

Figure 8:
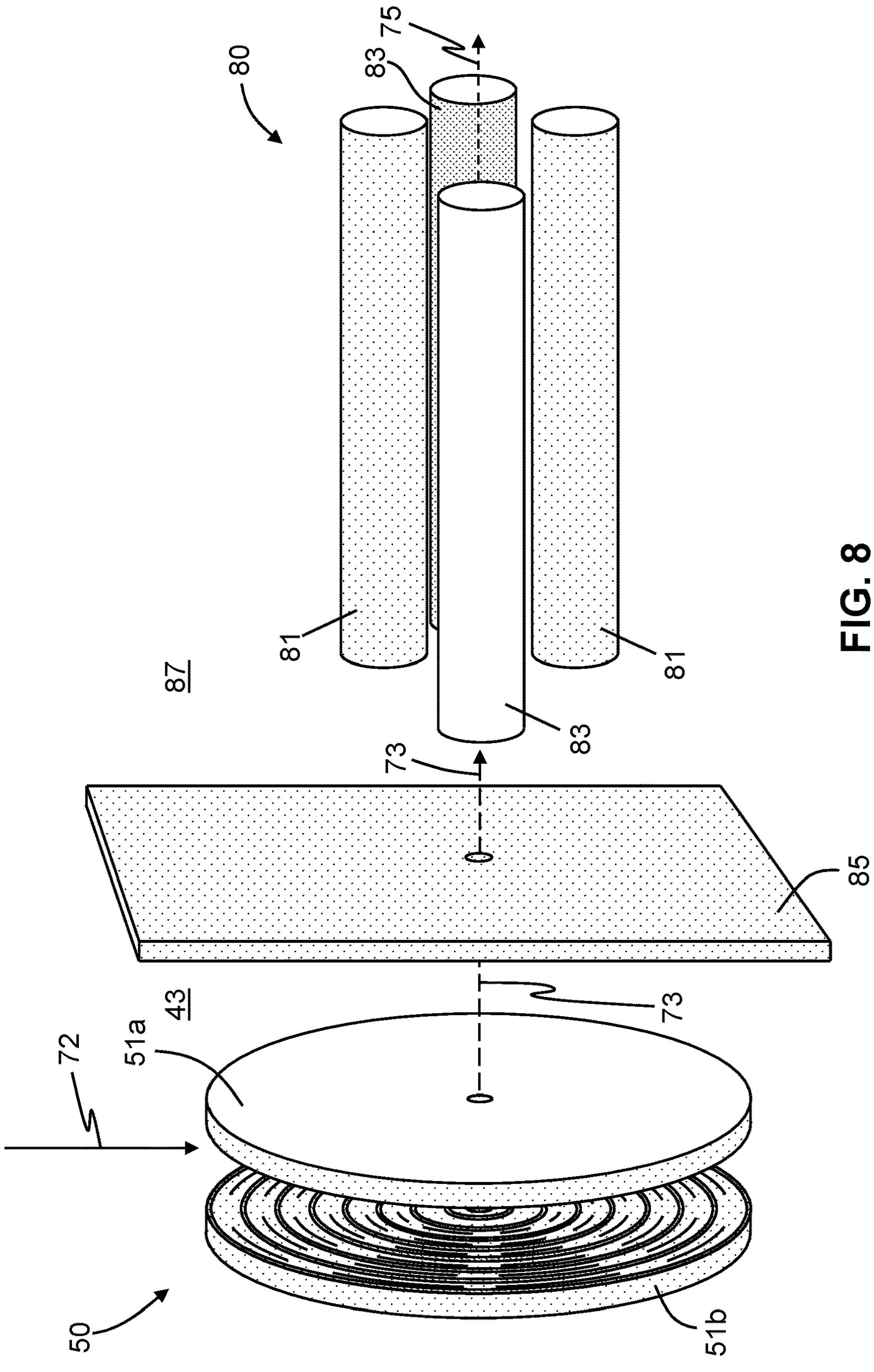
FIG. 8 is a schematic illustration of a portion of a mass spectrometer system incorporating an ion separation apparatus in accordance with the present teachings.

FIG. 8 is a schematic illustration of a portion of a mass spectrometer system incorporating an ion separation apparatus in accordance with the present teachings. Specifically, FIG. 8 depicts an ion separation apparatus 50 as taught herein that is fluidically coupled to a mass filter apparatus, such as a quadrupole mass filter 80. Although the ion separation apparatus 50 of FIGS. 3A-3D is shown in FIG. 8, it may be replaced by the ion separation apparatus 150 as shown in FIGS. 5A-5B or, indeed, by any ion separation apparatus that is modified in accordance with the present teachings or that operates in accordance with the operational principles taught herein. The ion separation apparatus and the mass filter apparatus are components of a mass spectrometer system that may comprise many other non-illustrated components such as an ion source, a mass analyzer, an ion detector, a fragmentation cell, various ion optical components, one or more power supplies, etc.

In the example shown in FIG. 8, the ion separation apparatus 50 receives a stream of ions 72 that comprises a plurality of different ion species having various different m/z values. The ions of the ion stream 72 are derived from an ion source such as an electrospray ion source, an atmospheric pressure chemical ionization source, an electron ionization source, etc. within an ionization chamber 41 as shown in FIG. 1. The ion stream preferably comprises a focused or collimated ion beam, as shaped by ion optical components (not illustrated in FIG. 8) that is introduced into the gap between the two ion carpet members 51*a*, 51*b* of the ion separation apparatus 50. A packet or pulse of ions of the ion stream 72 is preferably introduced into the gap along a preferred direction relative to the ion separation apparatus, such as tangential to the arcs of the ring electrodes or segmented ring electrodes. According to the operation of the ion separation apparatus as taught herein, the ion species of the original packet of ions are urged generally towards the ion exit aperture 52 within the gap between the ion carpet members 51*a*, 51*b* in accordance with their respective m/z values. Ions that reach the outer boundary of the central region 58 are then pulled directly towards the ion exit aperture 52 under the urging of electric fields generated by DC voltages applied to the ring electrodes within that region. As a result of these processes, an outlet ion beam 73 that emerges from the aperture 52 is temporally graded in terms of the range of m/z values of the emerging ion species. At any instant in time, the range of m/z values of the emerging ions is less than the full range of m/z values of the input packet of ions, with the average m/z value of the emerging ions increasing with time. Thus, a primary function of the ions separation apparatus 50 is to perform a partial separation of the originally input ion species.

The partially separated ions of the outlet ion beam 73 pass through an aperture in a partition 85 that separates an intermediate vacuum chamber 43 in which the ion separation apparatus 50 is disposed from a high-vacuum chamber 87 in which the mass filter is disposed. The pressure of the intermediate-vacuum chamber 43 is maintained at a gas pressure of from 1 mTorr-10 Torr (0.13 Pa-1.3 kPa), which is required to cool the thermal energy of ions to a level at which they may be induced to undergo centrifuge-like circular motion within the ion separation apparatus 50, 150. The pressure of the high-vacuum chamber 87 may be maintained at sub-millitorr gas pressures.

Figure 9:
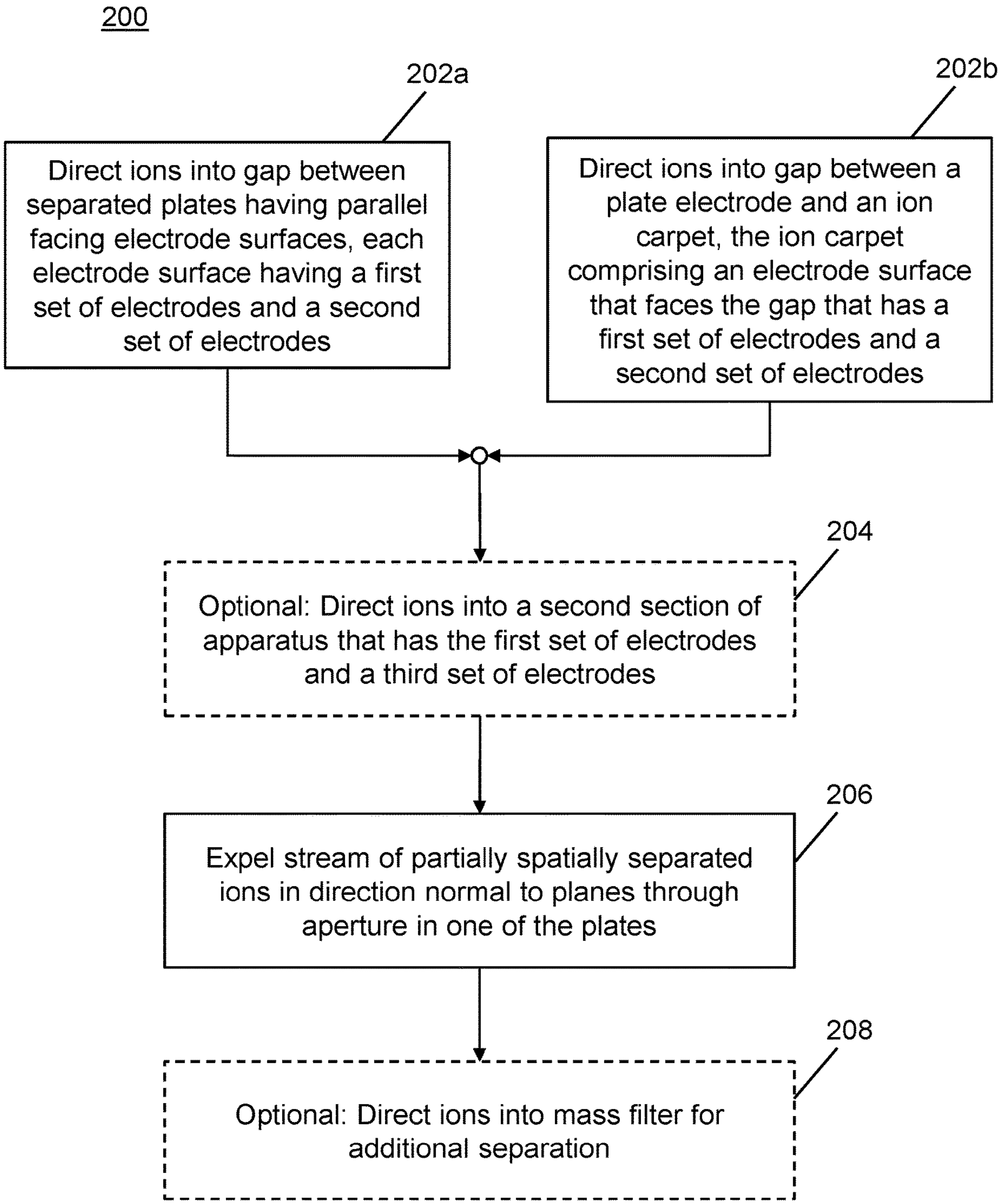
FIG. 9 is a flow diagram of a method in accordance with the present teachings.

FIG. 9 is a flow chart, in accordance with the present teachings, of a method 200 for separating and transporting ions received from an input ion stream. Execution of the method 200 may commence either with step 202*a*, which pertains to ion separation by an apparatus that comprises two ion carpet members (see FIG. 3B) or with step 202*b*, which pertains to ion separation by an apparatus that comprises a single ion carpet member disposed parallel to a plate electrode (see FIG. 3C). In step 202*a* of the method 200, a portion of the stream of ions is directed into an outermost section of a gap between separated ion carpet members of an ion separation apparatus in which electrode-bearing surfaces of the parallel ion carpet members face one another across the gap, wherein the electrode configurations of the two facing surfaces are identical to one another and wherein each electrode configuration in the outermost section comprises a first set of electrodes that create an electric field that draws the ions inward towards a central axis of the apparatus that is perpendicular to the parallel plates and further comprises a second set of electrodes that create a time-varying electric field that causes the ions to orbit around the central axis within the outermost section of the apparatus' gap. In alternative initial step 202*b* of the method 200, the portion of the stream of ions is directed into an outermost section of a gap between an ion carpet member and a plate electrode of an ion separation apparatus in which an electrode-bearing surface of the ion carpet members faces the gap, wherein the electrode configuration of the ion carpet member in the outermost section comprises a first set of electrodes that create an electric field that draws the ions inward towards a central axis of the apparatus that is perpendicular to the ion carpet member and further comprises a second set of electrodes that create a time-varying electric field that causes the ions to orbit around the central axis within the outermost section of the apparatus' gap. The orbiting of the ions around the central axis comprises sequential transfer of the ions through a first plurality of identical circle sectors that are defined by the configuration of the second set of electrodes. The sequential transfer of the ions through the sectors is caused by a travelling electrical potential wave that is created by the time-varying electric field.

In an optional step 204, the ions are transferred inwardly within the apparatus' gap from the outermost section of the gap into a second section of the gap, with each electrode configuration in the second section comprising the first set of electrodes, as noted above, and comprising a third set of electrodes instead of the second set of electrodes. The third set of electrodes create a time-varying electric field that causes the ions to orbit around the central axis within the second section of the apparatus' gap. The orbiting of the ions around the central axis comprises sequential transfer of the ions through a second plurality of identical circle sectors that are defined by the configuration of the third set of electrodes within the second section. The sequential transfer of the ions through the sectors is caused by a travelling electrical potential wave that is created by the time-varying electric field. Various operational and configurational parameters may vary between the outermost section and the second section of the gap. Such operational parameters include but are not limited to: the number of sectors; the strength of the electric field between sectors; and the speed of the traveling wave.

In step 206 of the method 200, the stream of ions, partially spatially separated in accordance with their respective mass-to-charge ratios by their traverse through the apparatus, are expelled from the apparatus through an ion exit aperture in one of the plates. The execution of the step 206 may include transferring the ions into a central section of the apparatus that comprises the first set of electrodes but that does not comprise either the second set or third set of electrodes. The ions are expelled from the apparatus ions in a direction normal to the planes of the parallel plates. The ions may be urged through the aperture and out of the ion separation apparatus by application of a voltage to an extractor electrode that is disposed adjacent to or within the aperture and/or by application of a voltage to a repeller electrode that is disposed on the electrode-bearing surface of the ion carpet that does not have the aperture. Finally, in optional step 208, the expelled ions may be transferred to a mass filter for additional separation.

It may be appreciated that one of ordinary skill in the art will recognize many simple or minor modifications that may be made to the apparatuses and methods described above without altering the basic functioning of the apparatuses or the results of the methods. It is to be understood that while the invention has been described in conjunction with the description of various examples thereof, the foregoing description is intended only to illustrate and not limit the scope of the invention. The scope of the invention is defined only by the appended claims.

What is claimed is:

1. An ion separation apparatus comprising:
- a first and a second ion carpet, each ion carpet comprising:
  - a substrate having a first face and a second face; and
  - a set of electrodes disposed on or beneath the first face, wherein a configuration of a first plurality of the set of electrodes defines at least one group of circle sectors;
- an ion exit aperture passing through one of the ion carpets; and
- one or more power supplies configured to provide oscillatory radio frequency (RF) voltages to at least a first subset of the electrodes of each ion carpet, to provide non-oscillatory direct current (DC) electrical potential differences across electrodes of at least the first subset of the electrodes of each ion carpet, and to provide time-varying DC voltages to the first plurality of the set of electrodes of each ion carpet that migrate through the sectors in the form of a traveling wave,
- wherein the first and second ion carpets are disposed parallel to one another with a gap therebetween, wherein the first faces face one another across the gap.

2. An ion separation apparatus as recited in claim 1, wherein each electrode of the first plurality of the set of electrodes of each ion carpet has the form of an arcuate segment of a circle, wherein each electrode of the first subset of the electrodes of each ion carpet is a ring electrode having the form of a full circle and wherein the circles of the ring electrodes and of the arcuate segments are concentric about a central axis of the ion separation apparatus that is perpendicular to the faces of the ion carpets and that passes through the ion exit aperture.

3. An ion separation apparatus as recited in claim 2, further comprising a respective region of each ion carpet about the central axis within which no electrodes of the first plurality of electrodes are present.

4. An ion separation apparatus as recited in claim 1, wherein a gas pressure within the ion separation apparatus is in the range of 0.13 Pa to 1.3 kPa.

5. An ion separation apparatus as recited in claim 1, wherein the gap is between 5 mm and 20 mm wide.

6. An ion separation apparatus as recited in claim 1, further comprising:

a central axis of the ion separation apparatus that is perpendicular to the faces of the ion carpets and that passes through the ion exit aperture; and a respective region of each ion carpet about the central axis within which no electrodes of the first plurality of electrodes are present.

7. An ion separation apparatus as recited in claim 1, wherein the first plurality of the set of electrodes of each ion carpet is identical to the first subset of the electrodes of said each ion carpet.

8. An ion separation apparatus as recited in claim 1, wherein the first plurality of the set of electrodes of each ion carpet defines a first group of circle sectors that are sectors of a first circle and a second group of circle sectors that are sectors of a second circle that is within the first circle, wherein a total number of the sectors of the first group of sectors is different than a total number of sectors of the second group of sectors.

9. A method of separating ion species of a group of ions, the ion species comprising a range of mass-to-charge ratios, the method comprising:

introducing the group of ions into an ion separation apparatus in which the ions are exposed to time-varying electrostatic forces that cause the ions to orbit around a central axis and to non-time varying electrostatic forces that are directed toward the axis; and transferring each of a plurality of subsets of the group of ions, each subset comprising a respective subset of the range of mass to charge ratios, from a respective annular zone surrounding the axis to an ion exit aperture that is centered on the central axis.

10. A method as recited in claim 9, further comprising introducing each of the plurality of subsets of the group of ions into a quadrupole mass filter apparatus.

11. A method as recited in claim 9, wherein the ion separation apparatus comprises:

a first and a second ion carpet, each ion carpet comprising:

a substrate having a first face and a second face; and a set of electrodes disposed on or beneath the first face, wherein a configuration of a first plurality of the set of electrodes defines at least one group of circle sectors;

an ion exit aperture passing through one of the ion carpets; and one or more power supplies configured to provide oscillatory radio frequency (RF) voltages to at least a first subset of the electrodes of each ion carpet, to provide non-oscillatory direct current (DC) electrical potential differences across electrodes of at least the first subset of the electrodes of each ion carpet, and to provide time-varying DC voltages to the first plurality of the set of electrodes of each ion carpet that migrate through the sectors in the form of a traveling wave, wherein the first and second ion carpets are disposed parallel to one another with a gap therebetween, wherein the first faces face one another across the gap.

12. A method as recited in claim 11, wherein a gas pressure within the ion separation apparatus is in the range of 0.13 Pa to 1.3 kPa.

13. A method as recited in claim 11, wherein the gap is between 5 mm and 20 mm wide.

* * * * *